United States Patent [19]

Lang

[11] Patent Number: 5,065,429

[45] Date of Patent: Nov. 12, 1991

[54] METHOD AND APPARATUS FOR PROTECTING MATERIAL ON STORAGE MEDIA

[76] Inventor: Gerald S. Lang, 812 Downs Dr., Silver Spring, Md. 20904

[21] Appl. No.: 626,409

[22] Filed: Oct. 14, 1990

Related U.S. Application Data

[63] Continuation of Ser. No. 358,263, May 30, 1990, abandoned, which is a continuation-in-part of Ser. No. 331,800, Apr. 3, 1989, abandoned.

[51] Int. Cl.$^5$ .............................................. H04K 1/00
[52] U.S. Cl. .......................................... 380/25; 380/4; 380/23
[58] Field of Search ............... 380/4, 23, 24, 25, 49, 380/50; 364/246.6, 246.9, 969, 969.3, 969.4

[56] References Cited

U.S. PATENT DOCUMENTS

| | | | |
|---|---|---|---|
| 4,349,695 | 9/1982 | Morgan et al. | 380/25 |
| 4,471,163 | 9/1984 | Donald et al. | 380/25 |
| 4,599,489 | 6/1986 | Cargile | 380/25 |
| 4,652,990 | 3/1987 | Pailen et al. | 380/25 |
| 4,677,434 | 6/1987 | Fascenda | 380/23 |
| 4,713,753 | 12/1987 | Boebert et al. | 380/25 |
| 4,731,841 | 3/1988 | Rosen et al. | 380/23 |
| 4,740,890 | 4/1988 | Tobin | 380/4 |
| 4,747,139 | 5/1988 | Tagfe | 380/4 |
| 4,785,361 | 11/1988 | Brotby | 380/4 |
| 4,799,258 | 11/1989 | Davies | 380/23 |
| 4,862,501 | 8/1989 | Kamitake et al. | 380/50 |
| 4,864,616 | 9/1989 | Pond et al. | 380/25 |
| 4,888,798 | 12/1989 | Earnest | 380/4 |
| 4,930,073 | 5/1990 | Cina, Jr. | 380/23 |
| 4,941,175 | 7/1990 | Enescu et al. | 380/4 |
| 6,590,470 | 5/1986 | Koenig | 380/49 |

Primary Examiner—Thomas H. Tarcza
Assistant Examiner—Tod Swann
Attorney, Agent, or Firm—Hoffman, Wasson & Gitler

[57] ABSTRACT

A method and apparatus for granting selected access to material such as data and databases, messages and other textual information, graphs, tables, maps, facsimiles (FAX) of all manner of transmitted materials, audio such as speech and music, video, images, and photographs, provided on storage media utilizing information encoded in the storage media. The storage media are included in one or more reading devices associated with a computer. A storage accessing device, such as a smart card, is used in conjuction with the computer to determine whether access to a particular user to specific storage media is granted. The storage media can be sub-divided into a plurality of logical zones and access to all or a portion of the material on the storage media is granted based upon the logical zones to which the user is allowed access. Information provided on the storage media would include an index table listing the security identification code, the logical zones to which a particular user is assigned as well as a personal security key used in conjunction with a personal security key provided in the smart card. The interaction between the user's personal accessing device and the index table provided on the storage media determine if access is granted as well as access privileges accorded to the user.

24 Claims, 4 Drawing Sheets

| | SECURITY IDENTIFICATION CODE | | |
|---|---|---|---|
| LOGICAL ZONES | ZONE ACCESS CODES | SYSTEM IDENTIFICATION CODES | PERSONAL SECURITY KEYS |
| 1,9,26 | 01 | 000000<br>⋮<br>087144 | XXXX<br>⋮<br>XXXX |
| 1,9,26,99 | 02 | 000000<br>⋮<br>029142 | XXXX<br>⋮<br>XXXX |
| 33 | 27 | 000000<br>⋮<br>006104 | XXXX<br>⋮<br>XXXX |
| 10,11 | 33 | 000010<br>⋮<br>000018 | XXXX<br>⋮<br>XXXX |
| 10,11,99 | 34 | 550000<br>⋮<br>550003 | XXXX<br>⋮<br>XXXX |
| 46,47,48,54 | 81 | 300000<br>⋮<br>308156 | XXXX<br>⋮<br>XXXX |
| 36 | 32 | 34 | 38 |

FIG. 4
STORAGE MEDIUM INDEX TABLE

| LOGICAL ZONES | ZONE ACCESS CODES | SECURITY IDENTIFICATION CODE | |
|---|---|---|---|
| | | SYSTEM IDENTIFICATION CODES | PERSONAL SECURITY KEYS |
| 1,9,26 | 01 | 000000 | XXXX |
| | | ⋮ | ⋮ |
| | | 087144 | XXXX |
| 1,9,26,99 | 02 | 000000 | XXXX |
| | | ⋮ | ⋮ |
| | | 029142 | XXXX |
| 33 | 27 | 000000 | XXXX |
| | | ⋮ | ⋮ |
| | | 006104 | XXXX |
| 10,11 | 33 | 000010 | XXXX |
| | | ⋮ | ⋮ |
| | | 000018 | XXXX |
| 10,11,99 | 34 | 550000 | XXXX |
| | | ⋮ | ⋮ |
| | | 550003 | XXXX |
| 46,47,48,54 | 81 | 300000 | XXXX |
| | | ⋮ | ⋮ |
| | | 308156 | XXXX |
| 36 | 32 | 34 | 38 |

METHOD AND APPARATUS FOR PROTECTING MATERIAL ON STORAGE MEDIA

This is a continuation of copending application Ser. No. 07/358,263 filed on May 30, 1990 now abandoned which is a continuation -in-part of 331,800 filed Apr. 3, 1989 now also abandoned.

BACKGROUND OF THE INVENTION

In the approximately 45 years since the development of the first crude computer, our society has seen a virtual explosion of information storage as well as information processing machines. With the advent of the personal computer, this information explosion has permeated virtually every facet of our daily lives. In the business community, personal computers are used to store and process a large amount of material which was previously maintained in paper files. Similarly, many homes now include a personal computer for the storage of personal data as well as the processing of other types of information.

During the infancy of the computer industry, when only very large companies or the government were able to afford to purchase and maintain relatively large mainframe computers provided with bulky storage media, security for access to this storage media was generally maintained by limiting access to the area in which the computer was stored as well as access to the computer itself. Typically, an authorized user was issued either a computer password or security card allowing access to the computer and any files included in the storage media utilized with the company. In other words, the person attempting to gain access to the computer must possess the knowledge and/or the tools of the authorized user. However, used in the context of today's smaller personal computers and the utilization of relatively small, portable storage media, this type of security program has proven to be inadequate. For example, if the password or security card would be stolen from the authorized personnel, computer access to an authorized person would be granted. Additionally, since the storage media is relatively small in size and, due to the need for allowing access to the material provided on this storage media to various authorized personnel remote from one another, it is important that a system be developed in which the storage media can be sent to various locations without the security of the material on the media being compromised.

In this context, several methods have been developed for protecting access to software programs stored on storage media such as read-only-memory (ROM). Examples of these devices are discussed in U.S. Pat. Nos. 4,757,468 issued to Domenik et al and 4,740,890 issued to William. Both of these patents describe apparatuses for protecting software programs which will be distributed on a magnetic disk or similar storage media. Verification routines provided directly on the storage media are utilized to protect access to the entire program. However, no device has been developed in which storage media itself is utilized to protect non-program information, such as textual material, data, graphs, or other digitally stored material. Furthermore, since various personnel may be granted access to only selective material which would be on the storage disk, the scenarios described with respect to the Domenik et al and William patents would not be applicable to an instance in which various personnel would be granted access to only a limited portion of the material provided on the storage media. This is important since only a single master print of any entire file may be manufactured and distributed to various personnel with limited access of material granted to each of the personnel. If limiting access was not possible, various storage devices and quite possibly many more storage devices, must be manufactured and given to each of the personnel, based upon the section of the material to which each individual has been granted access.

Similarly, no device was discovered in which the storage media, provided with software program information thereon, is used to allow access to only a portion of the program information, or one or more programs from a plurality of programs.

SUMMARY OF THE INVENTION

The deficiencies of the prior art are overcome by the present invention which is directed to a method and system for granting complete or limited access to information stored in a storage medium or media utilizing information physically stored in the storage medium or media. The particular storage medium or media are included in an appropriate reader which is connected to a standard personal computer, minicomputer, or a mainframe computer having a means for entering personal and system access data therein, such as a keyboard. The storage medium can be any permanent or erasable item such as an optical disk, a CD ROM, a WORM, a floppy disk, a disk pack, a smart card, an integrated circuit card, an optical card, as well as special items such as a BERNOULLI box disk, or any other type of storage medium. However, for simplicity sake, we shall describe the present invention with respect to a CD ROM storage medium. Additionally, a storage accessing device (used interchangeably herein with the following terms- personal accessing device and smart card) provided with an encrypted or non-encrypted personal security key as well as personal identification code is included to allow an individual access to the storage medium or media. Furthermore, for ease of understanding the present invention, we shall describe the storage accessing device with respect to a SMART card that does not require an electronic, optical, capacitive or magnetic reader to receive or transmit personal and system data.

Initially, when the CD ROM is mastered, the information storage portion of the CD ROM is broken up according to a predetermined classification system and stored in various logical zones, each of which contains a discrete set of databases or other material therein. There may be one or more logical zones recorded on the CD ROM. Users, based on their need to know, as well as the sensitivity of the material to be stored on the CD ROM, are accorded access privileges that correspond to previously designated logical zones. Based on an organization's or person's storage classification system, material are categorized and stored in the corresponding logical zones when the CD ROM is manufactured. Therefore, for each user being granted access privileges, a determination is made as to which logical zones each particular user would be allowed access. Based upon this determination, each user is assigned a particular zone access code (ZAC) which is translated into corresponding logical zones using an index table stored in the CD ROM. At the same time, paired to the ZAC, is a list of authorized system identification codes, each with its assigned unique personal security key (SK). Each authorized user is assigned a ZAC and a unique system identification code. For extremely secure applications, the intended user's biometric coded information can be paired with the personal security key. The ZAC, the system identification code, the personal security key code, plus the possible use of biometric coded information, as well as the logical zones assigned to the ZAC for each user or class of user, is included on the CD ROM in the form of an index table when it is manufactured.

When an individual wishes to gain access to the CD ROM, the user would correctly enter his particular personal identification code in the aforementioned smart card which would then display both the ZAC as well as the system identification code in either encrypted or non-encrypted form. The user, utilizing a keyboard, would enter this code into the computer which then compares the decrypted or encrypted codes obtained from both the smart card and CD ROM and if a match is obtained, would then verify that this particular system ID code is proper and that material this accessor seeks access to is stored on the storage medium or media. The computer then retrieves the paired personal security key (SK). The computer would then generate a random number which is displayed upon its screen to serve as a challenge to the personal accessing device (smart card). The user would input this random number into the smart card via its keypad. The smart card as well as the computer are provided with a particular encryption/decryption algorithm (alternately a security microprocessor chip). Both the computer and the smart card would simultaneously compute a response to the challenge code (random number) and this response is displayed on the smart card screen. This displayed response is then entered into the computer through its keyboard to determine whether there is a match. If a match is shown to have occurred, the computer will then display all the logical zones and material names therein to which access privileges have been granted and allow the user access to these logical zones provided in the storage media.

Further, the system then releases the system security key (SSK) which is transferred to the information processing device's volatile random access memory (RAM) or to the security microprocessor chip board installed in the information processing device. The system security key is used to decrypt all the encrypted material transferred from the CD ROM. The information processing device's copy of the system security key is destroyed when the information processing device loses its power or if said device concludes its CD ROM activities and is then used for other applications. Each CD ROM has its own system security key recorded on it which would be retrieved by the information processing device for use during search and retrieval activities when authorized user access is established.

The CD ROM search and retrieval program can be stored either on items such as floppy disks to be used at the time of CD ROM operation, on the information processing device's permanent memory, or on the CD ROM.

If a type of contact or contactless smart card is used which requires a non-human reader, the operation is very similar to the activities described above. The personal identification code can be entered via the computer keyboard or via a keypad on the card reader. The entry of the correct personal identification code enables the smart card to start transmission and the paired ZAC and system identification codes which are stored in the smart card microcomputer's EPROM or EEPROM are transmitted to the computer. Based on the transmitted ZAC, the index table on the storage media is searched to determine if there is a match. If the corresponding ZAC is not stored in the index table of the storage medium or media, a message is displayed on the computer screen that access will not be granted. If there is a match of the ZAC's, then the associated system identification codes stored on the storage medium or media are accessed until an exact match is found. If no match is found, the accessor will not be granted access. If an exact match is found, the personal security key paired with the user's system identification code is retrieved by the computer and is used to operate upon a randomly computer generated number. At the same time, the random number is also transmitted to the smart card reader which inputs the number to the smart card. The authorized user's smart card has both an identical encryption/decryption algorithm or microprocessor chip and personal security key to that of the information processing device and the CD ROM. The smart card operates on the random number using its internally stored personal security key and transmits the result through the card reader to the computer (information processing device). The information processing device uses an encryption/decryption algorithm or microprocessor chip to compare the results of both operations upon the random number. If a match occurs, the accessor's authorized status is ascertained and the predetermined access privileges are granted.

With respect to software program application, while prior art devices include verification routines provided on the storage media to protect access to the entire program, no prior art device, however, limits access to only a portion of this program, or access to one program from two or more stored programs. Additionally, access can be provided to one or more programs from a plurality of programs. To prevent unauthorized access, the storage accessing device can be programmed to permit only one download or a specific number of downloads of the portion of the program or one or more programs from a plurality of programs on the media allowed access by the user.

BRIEF DESCRIPTION OF THE DRAWINGS

These and other advantages of the objects of the invention can be understood from the following detailed description of a preferred embodiment of the invention described in conjunction with the drawings wherein:

FIG. 4 is a diagram showing a single entry in the index table of a storage medium.

DETAILED DESCRIPTION OF THE DRAWINGS

The present invention is directed to a method and apparatus for granting access to information such as data and databases, messages and other textual information, graphs, tables, maps, facsimiles (FAX) of all manner of transmitted materials, audio such as speech and music, video, images, photographs, or the like provided on a storage medium or media such as a CD ROM or the like. Contrary to most methods and devices for allowing access to the material provided on a storage medium or media, wherein access is granted to a computer included a storage media file, the present invention grants access to the storage media itself or a portion thereof based upon an indexed table included directly on the storage medium or media. The storage media, hereinafter a CD ROM, can be, if desired, divided into a plurality of logical zones. Based upon a user's need to know, access can be granted to all of the logical zones or a particular combination of logical zones. Based upon these logical zones, the user is assigned a zone access code, along with a system identification code, and a personal security key. For a more secure system, biometric coded information can also be assigned as part of the personal identifier. This information for each of the users is stored on the CD ROM along with the translation of each zone access code into its corresponding logical zone(s). Additionally, each of the users is assigned a personal identification code for use with the smart card to corroborate the user's identity and thereafter enable the smart card to initiate the challenge-response dialogue with the storage medium or media.

Figure 1:
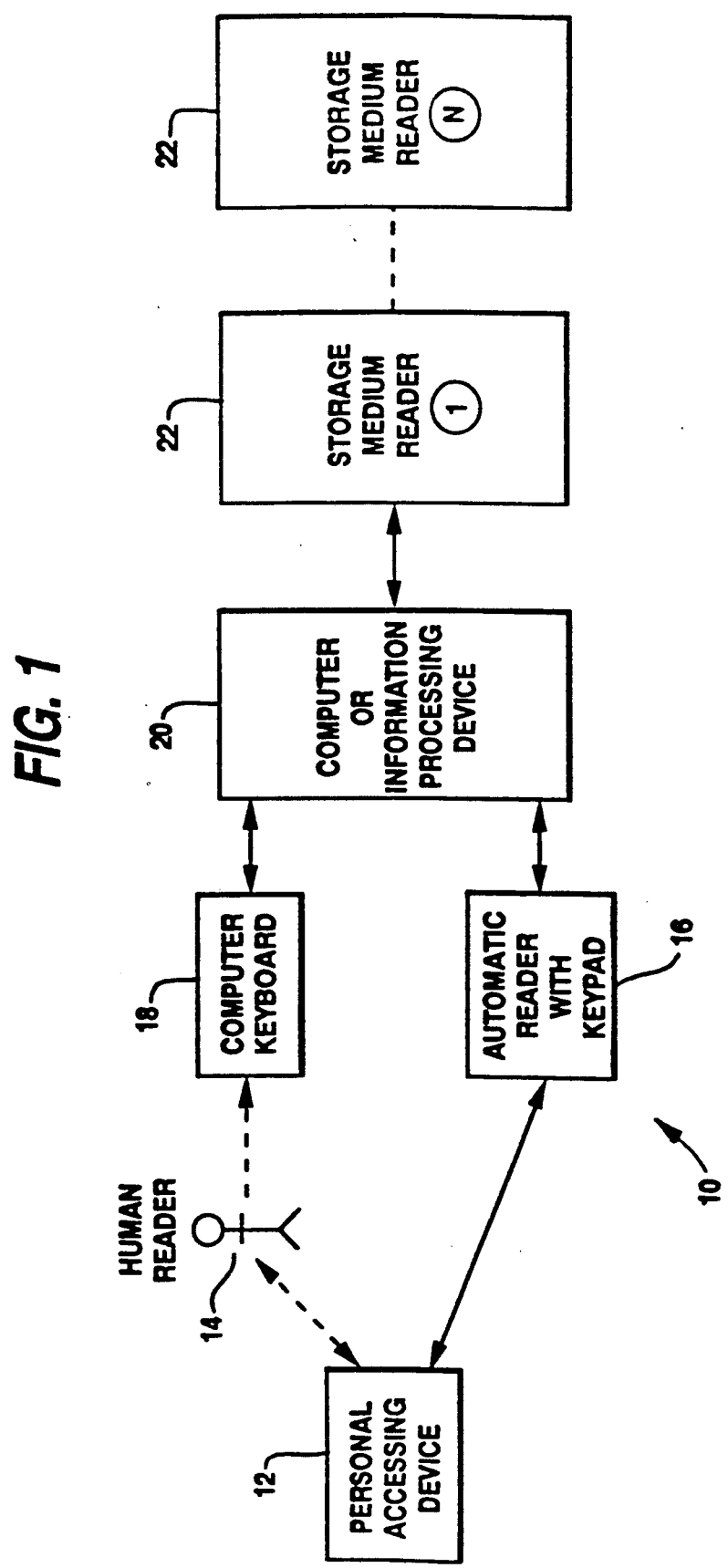
FIG. 1 is a block diagram of the system of the present invention.
Figure 2:
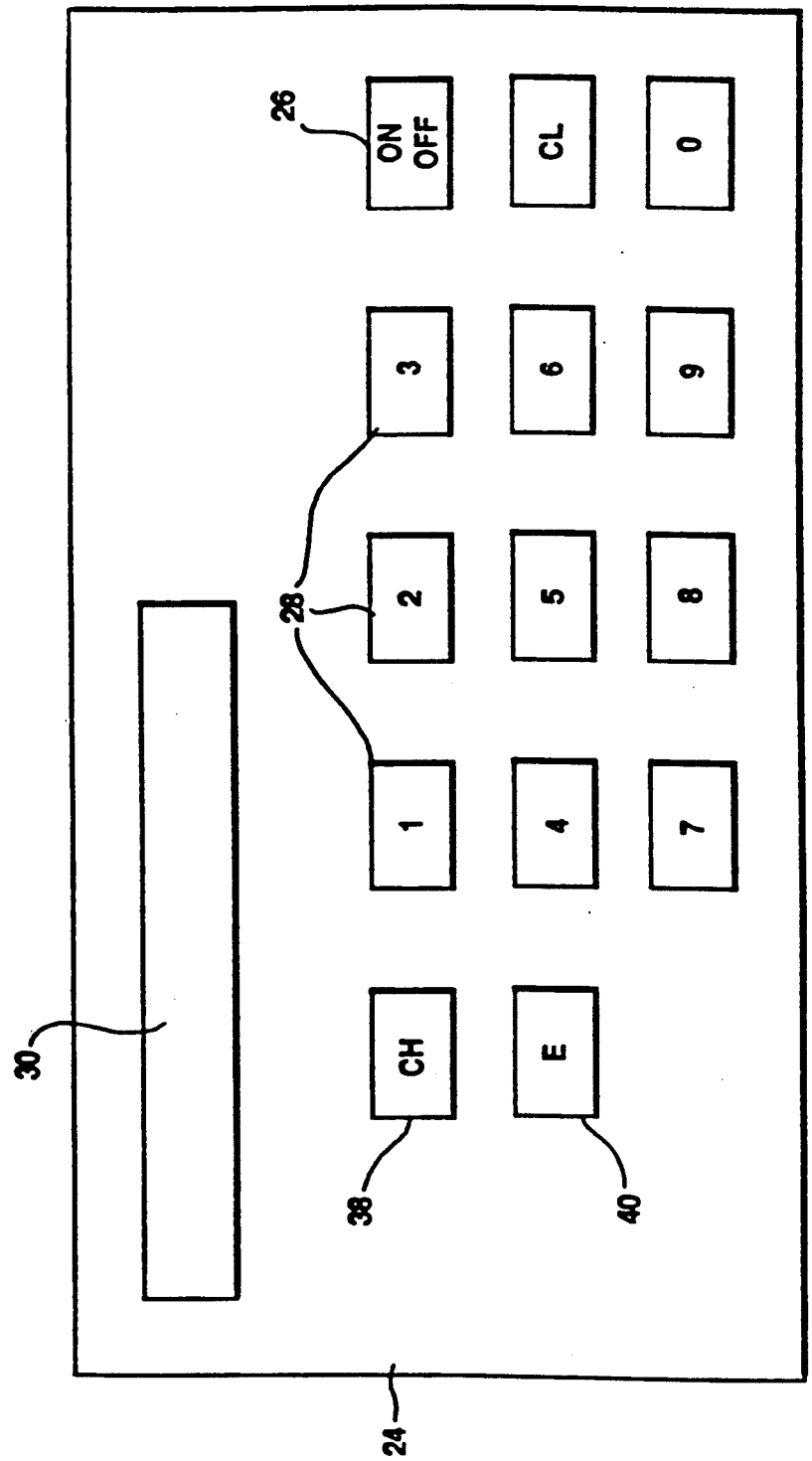
FIG. 2 is a diagram of a typical personal accessing device.
Figure 3:
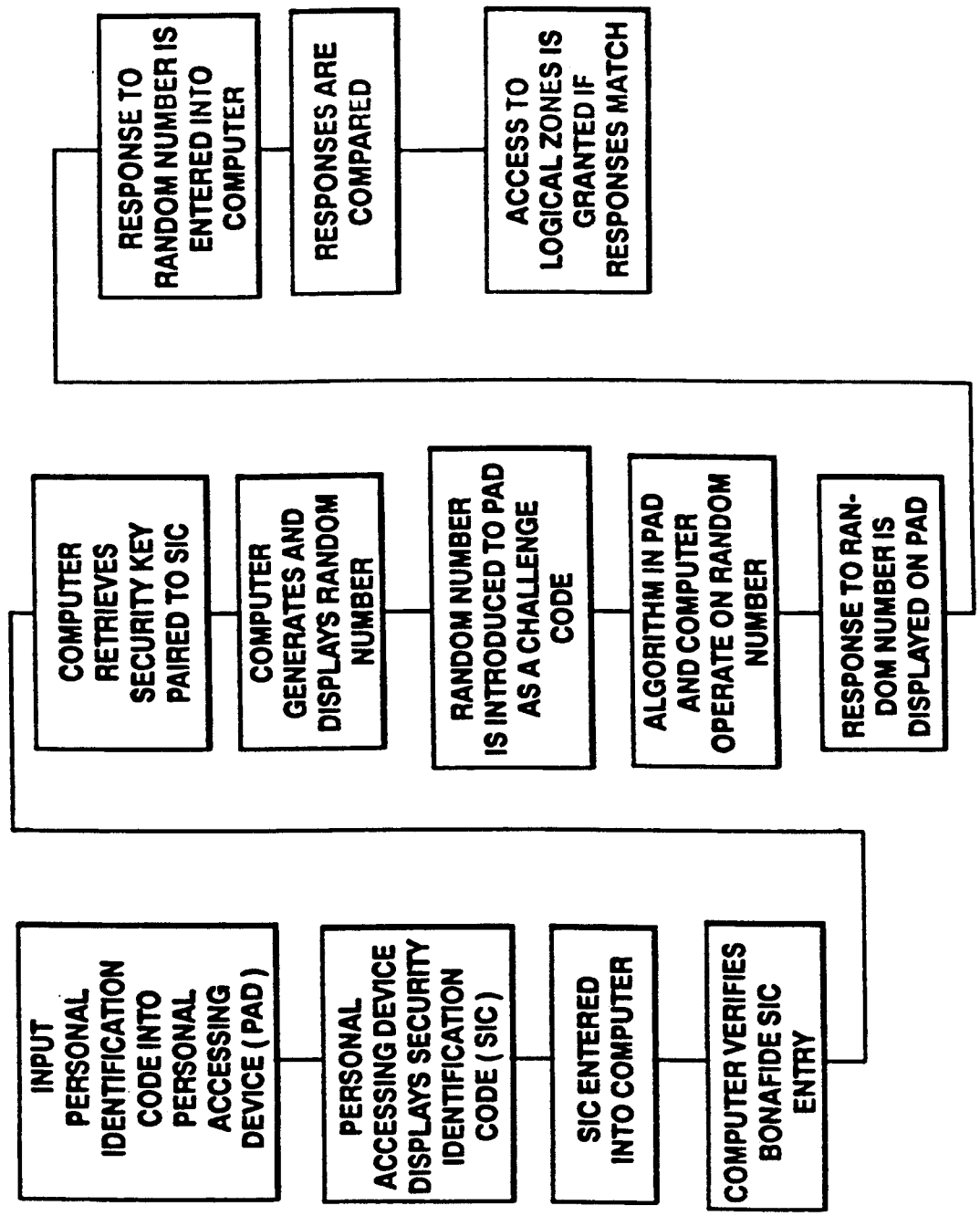
FIG. 3 is a flow diagram of a method of granting access to the storage media based upon the present invention.

Once all of the relevant information is directly provided for a user within the CD ROM as well as a personal accessing device such as a smart card, a user can gain access utilizing the system 10 illustrated with respect to FIG. 1. As shown therein, access to the storage media CD ROM is provided utilizing a personal accessing device 12. This device 12 can be various configurations of devices. As a smart card, it can be of types of smart card which would automatically interface with an automatic reader 16 connected to a computer or information processing device 20, or through the intervention of a human reader 14 with a keyboard 18. The computer or information processing device would run the gamut from microcomputers, minicomputers to mainframe computers. For illustrative purposes only, we shall discuss the present invention with respect to a smart card 24 shown in FIG. 2 with a keypad and light crystal display. An ON/OFF key 26 of the smart card 24 is depressed and the smart card is turned on. Additionally, it is noted that the smart card may use an encryption/decryption algorithm or microprocessor chip or any other encryption device if a security key device is employed with the CD ROM. Once the smart card is turned on and the correct personal identification code is entered into the smart card, and the CD ROM is inserted into a storage media reader 22, the challenge-response process is ready to begin.

Initially, the user would input a four digit or character personal identification code (PIC) into the smart card 24. It is noted that the exact number of digits of the PIC is not important and could consist of alphanumeric characters. The integrated circuit or microprocessor chip provided in the smart card contains the system identification code that will let the computer or information processing device know the identity of the authorized user. Typical system identification codes 34 are shown in the illustrative storage medium index table with respect to FIG. 4. Although the authorized user's security identification code consists of a two-digit zone access code, and a six-digit system identification code, the exact number of digits employed, as well as the use of alphanumerics can be modified based upon system needs and preference. The code is displayed at 30 of the smart card. Once the security identification code is displayed on the smart card 24, the accessor enters it into the computer or information processing device 20 via keyboard 18. At this point, the corresponding zone access code is searched for in the index table to find out if the storage medium or media contains stored material for that zone's access privileges. If the corresponding zone access code is missing from the storage medium or media index table, then a message will be displayed on the computer or information processing device screen 20 indicating that access is denied. If the zone access codes match, then the computer or information processing device verifies that the accessor may have privileges to material stored on the CD ROM(s) and will look up the paired personal security key 38 stored on the CD ROM. To ensure that the security aspect of the present invention is as inclusive as possible, the personal security key can be encrypted directly in the CD ROM. The zone access code 32 corresponds to the particular logical zones assigned to one or more authorized users. For example, as shown in FIG. 4, a zone access code of 33 corresponds to the logical zone 36 portion of the index table indicating that logical zones 10 and 11 will be allowed access. Any one of the logical zones on the CD ROM can contain one or more databases or other material. Therefore, as shown, any one of the zone access codes can be assigned to a user, who in turn, can be assigned an individualized system identification code associated with that zone access code from the total of up to 1,000,000 unique code numbers available. Certainly, if more user codes are required, alphanumeric characters can be used or the number of characters of the system identification codes 34 can be increased.

A special logical zone can be set aside to control the downloading of data from the storage medium or media. As shown in FIG. 4, the zone access code 32 value of 01 corresponds to logical zone access privileges 1, 9, 26. Zone access code 02 gives authorized users access to the same three logical zones of 1, 9 and 26, but the addition of logical zone 99 enables the authorized user to download the stored material. Without logical zone 99 privileges, an authorized user could not perform downloading.

Once the zone access code and system identification code are entered and accessed and matches confirmed, the personal security key code paired with this system identification code is utilized to verify the proper identification of the accessor.

A random number generator provided within the computer or information processing device 20 generates a random number, such as a four-digit number which is displayed by the computer or information processing device and serves as a challenge to the smart card 24. The user depresses the challenge key 38 and enters the random number into a smart card 24 using the keypad 28 and then depresses the enter key 40. An identical encryption/decryption algorithm or microprocessor chip and personal security key provided in both the computer or information processing device 20 as well as the smart card 24 performs an operation on the random number. The response to the challenge by the smart card is displayed and this number is entered into the keyboard 18. The computer or information processing device then compares this result with the result that it generated utilizing the CD ROM transmitted personal security key which is paired to the system identification code. If these two results are identical, access to the particular logical zones corresponding to the zone access code 32 would be allowed to that particular user.

This type of accessing system would allow the CD ROM to be circulated among a number of authorized users, allowing each user access potentially to all or only a discrete portion of the information included in the CD ROM, according to each person's access privileges.

The CD ROM or any type of storage media which is utilized would operate in conjunction with retrieval software stored in a number of ways such as on the CD ROM or on the computer or information processing device non-volatile memory. If it is stored on floppy disks or other reusable media, such as the computer's hard disk, it can be updated as necessary to detect and deactivate outdated, duplicated or lost personal accessing devices, such as smart cards, which are presented for system access. An added feature could be that if a reported lost smart card 12 was used to gain access, and the computer or information processing device 20 determined it was a lost smart card, a "killer" challenge code could be displayed, which when entered into the smart card would deactivate the device.

As illustrated in FIG. 1, an automatic reader 16 can be employed instead of manually inputting the information onto the smart card 12 or the computer keyboard by the human reader. In this instance, the smart card 12 and the computer or information processing device 20 would after the correct personal identification code is given, engage in its dialogue automatically to determine whether access by the accessor would be allowed.

While the invention has been illustrated in some detail, according to the preferred embodiments shown in the accompanying drawings, there is no intention to limit the invention to such detail. On the contrary, it is intended to cover all modification, alterations and equivalents falling with the spirit and scope of the appended claims.

What is claimed is:

1. A security system for granting user access to digitized materials provided on a storage medium or media, said system comprising:
   a computer system including at least one computer and a display screen,
   a storage medium subdivided into a plurality of management control, program and user logical zones, each of said logical zones provided with particular material therein, said storage medium directly provided thereon with an access management control means for indicating which of said user logical zone on zones the user will be allowed to access based upon accessing information provided to the system by the user, said access management control means provided in said storage medium at a location remote from, and non-contiguous with, said user logical zones;
   a reader or drive for reading the digitized material provided in said plurality of logical zones as well as said access management control means of said storage medium;
   a personal accessing device containing a security identification code, to enable said personal accessing device to be in communication with said computer system for transmitting said security identification code to said computer system;
   wherein, said security identification code is compared to said access management control means provided on said storage medium to determine the particular user logical zone or zones to which the user is allowed access utilizing said display screen of said computer system.

2. The security system in accordance with claim 1, wherein said personal accessing device is initiated by a correct personal identification code entered by the user.

3. The security system in accordance with claim 1 wherein said access management control means and said personal accessing device are further provided with a particular personal security key code associated with said security identification code for each authorized user, and said computer system is further provided with a random number generator, both said computer system or alternately said storage medium and said personal accessing device further provided with identical or cooperating encryption decryption algorithm for utilizing a number generated by said random number generator for determining whether user access is granted to one or more particular logical zones associated with the user's security identification code.

4. The security system in accordance with claim 3 wherein said security identification code consists of a zone access code portion corresponding to logical zone access assigned to a particular user and a system identification code corresponding uniquely to the user and paired to said personal security key code.

5. The security system in accordance with claim 1 wherein said personal accessing device is provided with a series of input keys and a display for displaying a user's security identification code based upon a correct personal identification code entered into said personal accessing device by the user to enable the said personal accessing device, and wherein said computer system includes a keyboard for entering the security identification code displayed on said personal accessing device.

6. The security system in accordance with claim 1, wherein access is granted to a plurality of removable storage media.

7. The security system in accordance with claim 1 in which said storage medium is removably provided in said computer system.

8. A security system for granting user access to non-software programs provided on a storage medium, said system comprising:
   a computer system including at least one computer and a display screen;
   a storage medium provided with non-software programmed material therein, said storage medium directly provided thereon with an access management control means for indicating whether the user will be allowed access to said storage medium or media accessing information provided to the system by the user, said access management control means provided in said storage medium at a location remote from, and non-contiguous with, said user logical zones;
   a reader for reading the non-software programmed material provided on said storage media;
   a personal accessing device containing a security identification code, said personal accessing device in communication with said information processing device for transmitting said security identification code to said computer system;
   wherein said security identification code is compared to said access management control means provided on said storage medium to be used in the process of determining whether a user will be allowed access to the storage medium utilizing said display screen of said computer system.

9. The security system in accordance with claim 8 wherein said access management control means and said personal accessing device are further provided with a particular personal security key code or codes associated with said security identification code, said computer system further provided with a random number generator, both said information processing device and said personal accessing device further provided with identical or cooperating encryption/decryption algorithms for utilizing a number generated by said random number generator and operated upon independently using the respective personal security key codes, for determining whether user access shall be granted to specific portions or all of the storage medium.

10. The security system in accordance with claim 8 wherein said personal accessing device is provided with a series of input keys and a display for displaying a user's security identification code based upon a correct personal identification code entered into said personal accessing device by the user, and wherein said computer system includes a keyboard for entering the security identification code displayed on said personal accessing device.

11. The security system in accordance with claim 8, wherein access is granted to a plurality of removable storage media.

12. The security system in accordance with claim 8 wherein personal accessing device is initiated by a personal identification code entered by the user.

13. The security system in accordance with claim 8 in which said storage medium is removably provided in said computer system.

14. A method of granting user access to material provided on a storage medium, adapted to be read by a reader or drive in communication with a computer system including at least one computer, said storage media containing one or a plurality of management information control, program and user logical zones, comprising the steps of:
  assigning security identification codes to all users allowed access to the storage medium or media;
  preparing an access management control means for indicating to which of said user logical zones a particular user is allowed access corresponding to said security identification codes said access management control means provided in the storage medium at a location remote from, and non-continuous with said user logical zones;
  recording said access management control means directly on the storage medium or media;
  presenting a security identification code personalized for each user to the computer system utilizing a personal accessing device;
  comparing, in the computer system said security identification code to said access management control means containing security identification codes directly recorded on storage medium to determine wherein the accessor is a potential authorized user of the storage medium.

15. The method of granting user access to a storage medium in accordance with claim 14 further including the step of determining the user logical zone or zones to which a particular user is granted access and whether the authorized user can have downloading privileges, based upon said comparing step.

16. The method of granting user access to a storage medium or media in accordance with claim 15 further including the steps of:
  including personal security key codes associated with each of said security identification codes in said access management control means and further including a personal security key code associated with a particular user in the personal accessing device;
  generating a random number in said information processing device;
  displaying said random number on said computer system;
  utilizing said random number and said personal security key code associated with a particular security identification code to produce an output code based upon an encryption/decryption algorithm provided in said computer system;
  utilizing said random number and said personal security key code included in the personal accessing device to produce an output code based upon an encryption/decryption algorithm provided in the personal accessing device identical to the computer system's encryption/decryption algorithm; and
  examining the output codes produced in said utilizing step to determine whether access is granted to the storage medium or media.

17. The method of granting user access to a storage medium in accordance with claim 16 further including the steps of:
  entering a correct personal identification code in the personal accessing device which would release the stored security identification code; and
  entering or transmitting the security identification code generated in said previous step into the computer system.

18. The method of granting user access to a storage medium in accordance with claim 17 including the steps of:
  entering or transmitting the random number generated by computer system directly into the personal accessing device;
  displaying the output code generated by the personal accessing device;
  entering or transmitting the output code generated by said previous step in the computer system; and
  retrieving by said information processing device of the system security key code stored in each storage medium.

19. The method of granting user access to a storage medium in accordance with claim 15, further including the step of determining whether the authorized user has been assigned downloading privileges, based upon said comparing step.

20. The method of granting user access to a storage medium in accordance with claim 14 further including the steps of:
  including personal security key codes associated with each of said security identification codes in said access management control means and further including functionally matching personal security key code associated with a particular user of the personal accessing device;
  generating a random number in said computer system;
  displaying said random number and said personal security key code associated with a particular security identification code to produce an output code based upon an encryption/decryption algorithm provided in said computer system;

utilizing said random number and said personal security key code included in the said personal accessing device to produce an output code based upon the encryption/decryption algorithm provided in the personal accessing device identical to the computer's encryption/decryption algorithm;

decrypting and examining the output codes produced in said utilizing step to verify that the user possesses the knowledge and tool of the authorized user to determine whether access is granted to whole or portions of the storage medium or media; and retrieving the system security key stored in the storage medium or media and transferring to secure volatile portion of the computer's memory or encryption/decryption processor chip.

21. The method of granting user access to a storage medium in accordance with claim 20 further including the steps of:

entering the correct personal identification code in the personal accessing device which would release the stored security identification code for display or transmittal;

entering or transmitting the security identification code generated in said previous step into the computer system.

22. The method of granting user access to a storage medium or media in accordance with claim 21 including the steps of:

entering or transmitting the random number generated by the computer system directly into the personal accessing device;

displaying the output code generated by the personal accessing device; and entering and transmitting the output code generated by said previous step in the computer system.

23. The method in accordance with claim 20 in which said storage medium is removably provided in said computer system.

24. The security system in accordance with claim 14 in which said storage medium is removably provided in said computer system.

* * * * *